A. B. Sprout.

Horse Hay Forks.

No. 2818 Reissued Dec. 17, 1867.

Witnesses.

James F. Johnston

James McBrid

Inventor.

A. B. Sprout

United States Patent Office.

ARIEL B. SPROUT, OF PICTURE ROCKS, PENNSYLVANIA.

*Letters Patent No.* 54,431, *dated May* 1, 1866; *reissue No.* 2,818, *dated December* 17, 1867.

IMPROVEMENT IN HORSE HAY-FORKS.

The Schedule referred to in these Letters Patent and making part of the same.

TO ALL WHOM IT MAY CONCERN:

Be it known that I, ARIEL B. SPROUT, of Picture Rocks, (formerly of Hughesville,) in the county of Lycoming, and State of Pennsylvania, have invented a new and useful Improvement in "Horse Hay-Forks;" and I do hereby declare that the following is a full, clear, and exact description thereof, reference being had to the accompanying drawings, and to the letters of reference marked thereon.

My invention consists in combining in one implement a hay-elevator and hay-cutter, so constructed that it will cut its way into the hay, cut hay down in the stack or mow, and also be used for hoisting hay.

To enable others skilled in the art to make and use my invention, I will proceed to describe its construction and operation. In the accompanying drawings, which form part of my specification—

Figure 3:
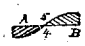
Figure 3 represents a transverse section of the cutting-edges of my improved hay-elevator, when cut through at line marked *x'*.

In the drawings, A and B represent two rods or flat bars of iron or steel, or steel and iron combined. Said bars or rods are furnished with barbs or prongs, marked *d* and *o*. The rods or bars A and B, and their barbs or prongs, are made substantially in the form represented in the accompanying drawings. The parts below the line, marked X', have the edges, marked 4 and 5, made sharp, as shown in fig. 3. The rods or bars A and B are hinged together, at the point marked *e*, by means of a bolt or rivet; and on the upper end of bar A is a handle, marked *m*, which is provided with a groove, marked *s*. The upper end of bar A is provided with a loop, marked *k*, for attaching the rope used in hoisting. To the upper end of the bar B is attached, at the point marked 2, a lever, marked *n*; and near the upper end of the bar A is attached a lever, marked *w*. These two levers, *n* and *w*, are hinged together by the rod in the handle *j*. To the eye, marked 6, is attached a cord, *y*, which passes up and over the handle *m*, and in its groove, *s*. The point X of the rod or bar A is furnished with an offset for the point *h* of the bar or rod B, so that the point *h* will not catch in entering the hay. The barbs *d* and *o* should have their edges made sharp, so that they will cut their way in entering the hay.

Figure 1:
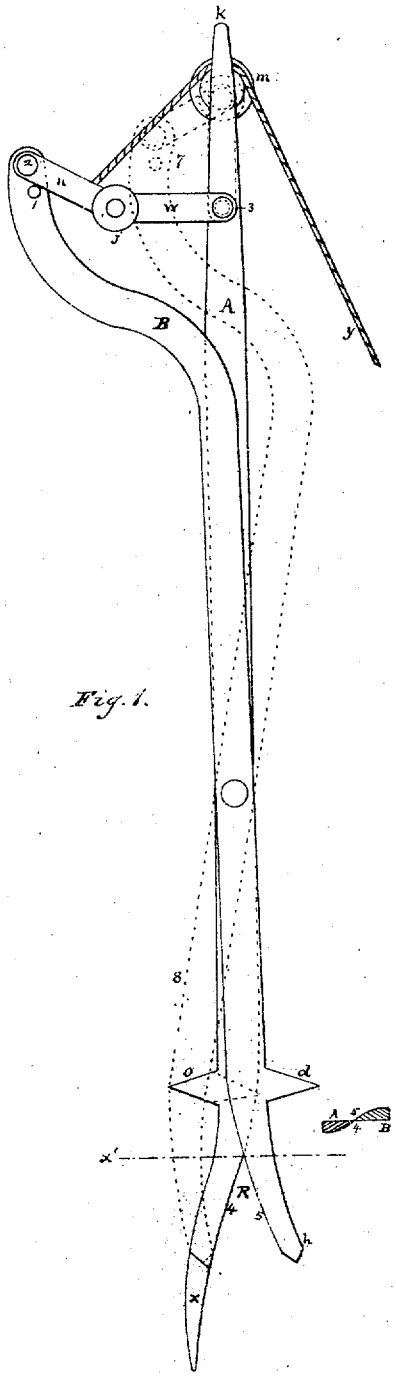
Figure 1 represents a front elevation of my improved hay-elevator and hay-cutter combined in one implement.
Figure 2:
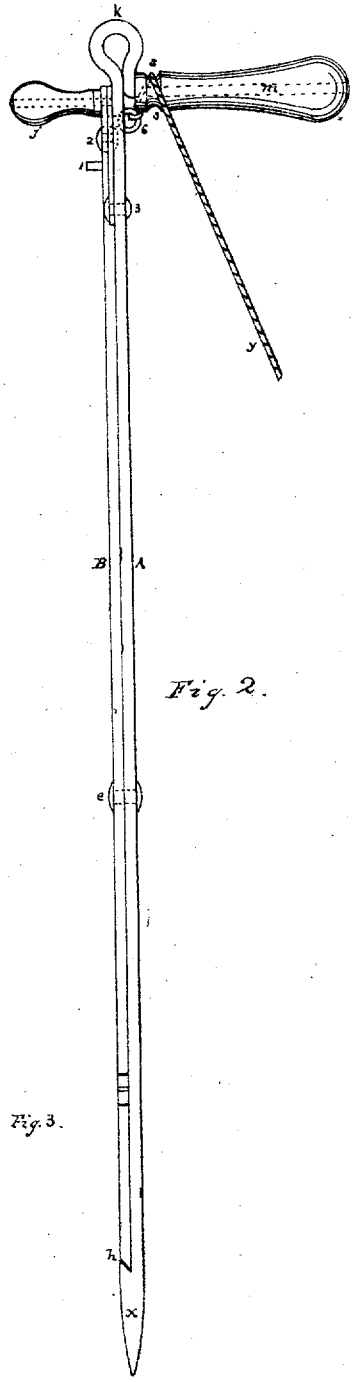
Figure 2 represents a side elevation of the same.

As the construction of my improved hay-cutter and hay-elevator will readily be understood by the skillful mechanic from the foregoing description, and by reference to the accompanying drawing, I will, therefore, without further description of its construction, proceed to describe its operation, which is as follows:

Having all things constructed and arranged as described and represented, I close the rods or bars A and B, as shown in fig. 2. I then force them, when thus closed, down into the hay by pressing on the handle *m*. The edges 4 and 5 will cut the way for the bars A and B. I then press on the handle *j*, which will cause the levers *n* and *w* to spread the bars A and B, as shown in fig. 1, until the lever *n* comes in contact with the stop marked 1. I then hoist the elevator and its load of hay to the place desired, and then unship it by drawing on the cord *y*, which will bring the bar B into the position represented by the dotted lines 7 and 8.

The cutting is performed by arranging the parts as represented in fig. 1, and then forcing the bars A and B, when thus spread, into the hay; and the hay which comes in the angle R is cut by the edges 4 and 5. After the desired quantity is cut, the cut hay is removed by operating with the elevator in the manner described.

Having thus described the nature, construction, and operation of my improvement, what I claim as of my invention, is—

1. Combining in one implement a hay-elevator and hay-cutter, so constructed that, when used as an elevator, it will cut its way into the hay, and so operating that it will catch in the hay for elevating it, and then may be released at will from its hold in the hay for discharging it, substantially as described.

2. The combination and arrangement of the bars A and B, provided with barbs and cutting-edges at their lower extremities, and levers *n* and *w*, substantially as herein described, and for the purpose set forth.

A. B. SPROUT.

Witnesses:

JAMES J. JOHNSTON,

CHARLES WALTER.